United States Patent Office 2,805,149
Patented Sept. 3, 1957

2,805,149
REDUCTION OF OXIDES TO METAL

Felix A. Schaufelberger, Basel, Switzerland, assignor to American Cyanamid Company, New York, N. Y., a corporation of Maine No Drawing. Application January 16, 1957,
Serial No. 634,407

4 Claims. (Cl. 75—119)

This invention relates to the hydrometallurgical production of powdered metals. More particularly, this invention relates to the production of powdered copper, nickel and cobalt by chemical reduction of the corresponding cuprous, nickelous, or cobaltous oxide or hydroxide. Still more particularly, it relates to production of powdered copper, nickel and cobalt by direct gas reduction of an aqueous slurry of cuprous, nickelous or cobaltous oxide or hydroxide.

As such, this application constitutes a continuation-in-part of my copending application, Serial No. 318,331, filed November 1, 1952, now abandoned.

Various processes are known for treatment of copper, nickel and cobalt-bearing ores and the like whereby the metallic constituents may be chemically separated and recovered. Unfortunately, many of these procedures result in recovery of the copper, nickel and/or cobalt as an oxide or hydroxide. The latter must then be further processed to recover a relatively pure metal product.

Generally, this is accomplished by dry reduction which comprises heating and subjecting the oxide or hydroxide to the action of a reducing agent such as hydrogen, carbon monoxide or carbon itself. Many techniques employing various types of equipment have been developed for practicing this procedure. Each of these, however, suffers from one or more defects. Temperature control and sintering are problems which make it difficult to obtain a product wholly satisfactory for many powder metallurgical applications. Particular problems appear where the oxide or hydroxide has been produced by precipitation, for instance, from a mixed electrolyte. Probably the most troublesome of these is a material handling problem. In such instance, the material must be filtered and washed to remove any soluble impurities. Resultant wet solids must then be dried and transferred to the reduction chamber. Following reduction, the reduced product may have to be washed again. These operations, because of the nature of the material, are not only difficult and repetitive, but unduly expensive.

It is, therefore, a primary object of this invention to provide a chemical reduction process which is not hampered by the above drawbacks. Such a process, moreover, should be capable of producing powdered copper, nickel and cobalt of fine, uniform particle size. It should not involve the use of unusual or expensive chemical reagents. Additionally, it should require only apparatus that is simple and relatively inexpensive.

Despite the complexity of previous operations, the objects of this invention have been met in a surprisingly simple but effective manner. Particularly is this true when considering that previous known hydrometallurgical processes for producing powdered metal by gas reduction were necessarily practiced on metallic salt solutions. Solubility of the metal salt in the dissolving liquor, therefore, was a limiting factor in the use thereof. Accordingly, it is all the more surprising that the present invention is so effective, inasmuch as the material being treated need not be dissolved, and in fact, may be treated in quite concentrated slurries.

A general outline of the process of this invention may be easily stated. Cuprous, nickelous or cobaltous oxide or hydroxide to be treated is first mixed with water to produce a concentrated slurry. Resultant slurry is then subjected to an elevated temperature and a superatmospheric pressure in the presence of a reducing gas. Treatment is continued for sufficient time to effect complete reduction of substantially the entire metal content. The slurry is then cooled and filtered, and separated product dried.

In general, the source of oxide or hydroxide to be treated is immaterial to the practice of this invention. The process may be conducted on cuprous, nickelous or cobaltous oxide or hydroxide obtained in any manner. However, since the invention is most advantageous when employed in conjunction with chemical separation and recovery processes, as described above, it will be further discussed with respect to products so obtained.

In such procedures the oxide or hydroxide is precipitated from solution and usually carries with it certain impurities. When treating such a product by dry reduction, much difficulty is encountered, as described above, in first filtering and washing the product free of impurities. This difficulty is completely avoided in the instant invention. Since the oxide or hydroxide is reduced in the form of a slurry, any impurities which would be removed by extensive washing will be solubilized by the slurry liquor. Separation of the product may be done by decantation or filtration and any washing desired may be accomplished in a similar manner. Again, since the oxide or hydroxide is to be subsequently slurried, the drying steps necessary in dry reduction are eliminated.

Resultant cuprous, nickelous or cobaltous oxide or hydroxide is then slurried. An advantage of this invention is its economy resulting from the fact that large quantities of oxide or hydroxide may be treated at one time. The slurry, therefore, should be as concentrated as permissible. Concentration, however, is in turn governed by other considerations. For instance, the instant process overcomes the material handling problem of dry reduction since a slurry can be handled as a liquid. It is important, therefore, that the slurry be not so concentrated that it cannot be handled by pumps and allied equipment. Also, since a suspension is being treated, the reducing agent can readily make intimate contact with each particle with the result that a powder of fine uniform particle size is obtained. This effect, however, can be minimized by over concentration. Exact numerical limitations of concentration is difficult to establish since concentration depends to some extent on the particular metal being treated. In general, however, it is possible to handle 50% slurries, and in some cases even higher. An optimum range is about 25%–40%. The particular manner in which the slurry is prepared forms no part of this invention. Any suitable mechanical means may be employed.

After a slurry of the desired consistency has been prepared it is heated to an elevated temperature. The particular treating temperature employed may vary somewhat with the particular metal slurry being treated as well as the reducing agent employed. The temperature may range from as low as 100° F. to as high as 500° F. and, in some instances, even higher. The optinum range, however, is from about 200° F. to about 450° F. At lower temperatures, reduction is too slow to be economical. Any advantage to be gained by using higher temperatures is usually offset by the expense incurred in providing equipment capable of handling the correspondingly higher pressures.

Various reducing agents may be employed. However, those containing sulfur, such as H₂S and SO₂, should be avoided since their use results in formation of products containing sulfur. Hydrogen may be successfully employed and, generally, is readily available. Carbon monoxide is a suitable reducing agent although its use results in $CO_2$ formation. Various hydrocarbon compounds are available but are generally too inactive for use. The preferred reducing agent, therefore, is hydrogen.

The reducing agent may be introduced into the reduction chamber before, during or after heating of slurry to the desired temperature. It may be introduced in any way desired. For instance, the reducing agent may be introduced above the surface of the slurry or it may be introduced directly into the body of the slurry. Reduction is conducted with simultaneous agitation of the slurry. This insures intimate contact of the reducing agent with the slurried particles. Agitation may be conducted by any suitable means, the exact nature of which forms no part of the invention.

Total pressures used during reduction usually will not exceed about 1000 p. s. i. g. Of this total pressure, at least about 100 p. s. i. g. will constitute reducing gas partial pressure. At the preferred operating temperature range of about 200° F. to 450° F. the optimum reducing gas partial pressure will be from about 300–600 p. s. i. g.

Treatment is continued until complete reduction of the substantially entire metal is obtained. Obviously, reduction time will depend upon the various other conditions. Under those most favorable, reduction will usually be complete in from about one to two hours or less. Reduced slurry is cooled, preferably by heat exchange with incoming unreduced slurry. Cooled slurry is then filtered and the product subjected to drying without necessity of washing. Drying preferably is conducted in a hydrogen atmosphere.

The invention is concerned with the production of copper, nickel and cobalt from cuprous, nickelous and cobaltous oxides and hydroxides, respectively. The following examples illustrate the invention. All parts are by weight unless otherwise noted.

*Example 1*

Nickelous hydroxide is slurried in water to form a slurry of about 25% solids. The slurry is then heated in an autoclave to a temperature of 205° C. and subjected to a 200 p. s. i. g. partial pressure of hydrogen for 45 minutes. After cooling, the solids are filtered and dried without washing. The product analyzes 99.8% nickel.

*Example 2*

In processing an ammoniacal copper leach solution, cuprous oxide is precipitated, solids filtered, washed and slurried in water to form a slurry of 25%. This slurry is then treated in an autoclave for 45 minutes at 250° C. and 300 p. s. i. g. partial pressure of hydrogen. After cooling and filtering, the product is dried and found to analyze 99.9% copper.

*Example 3*

Cobaltous oxide is slurried in water to form a 35% slurry. This slurry is then treated in an autoclave for 120 minutes at a temperature of 220° C. and a hydrogen partial pressure of 500 p. s. i. g. After cooling, the product is filtered and dried without washing. The dried product analyzes 99.7% cobalt.

I claim:

1. A method of producing elemental metal as a powder of fine, uniform particle size which comprises: preparing a concentrated slurry in water of a compound selected from the group consisting of cuprous, nickelous and cobaltous oxides and hydroxides, the solids content of said slurry being not more than about 50%; treating said slurry by subjecting it to a temperature of about 100°–500° F., a total pressure not exceeding about 1000 p. s. i. g. and a partial pressure of at least 100 p. s. i. g. of a non-sulfidizing reducing gas whereby said suspended compound is reduced to elemental form, said slurry being agitated during said treatment; continuing treatment until reduction to metal is substantially complete; cooling resultant slurry, and collecting elemental metal product.

2. A method according to claim 1 in which the compound is a cuprous compound.

3. A method according to claim 1 in which the compound is a nickelous compound.

4. A method according to claim 1 in which the compound is a cobaltous compound.

References Cited in the file of this patent

UNITED STATES PATENTS

| | | |
|---|---|---|
| 1,275,232 | Edison | Aug. 13, 1918 |
| 1,426,517 | Sulzberger | Aug. 22, 1922 |
| 1,686,391 | Muller et al. | Oct. 2, 1928 |
| 1,783,662 | Marx et al. | Dec. 2, 1930 |
| 2,375,506 | Turck | May 8, 1945 |
| 2,726,151 | Kern | Dec. 6, 1955 |

OTHER REFERENCES

Mellor, J. W.: "A Comprehensive Treatise on Inorganic Theoretical Chemistry," Longmans, Green & Co., London (1922), vol. 1, page 328.